United States Patent [19]

Gove

[11] Patent Number: 5,347,321
[45] Date of Patent: Sep. 13, 1994

[54] COLOR SEPARATOR FOR DIGITAL TELEVISION

[75] Inventor: Robert J. Gove, Plano, Tex.

[73] Assignee: Texas Instruments Incorporated, Dallas, Tex.

[21] Appl. No.: 129,716

[22] Filed: Sep. 30, 1993

[51] Int. Cl.[5] .............................................. H04N 9/77
[52] U.S. Cl. .................................... 348/663; 348/445; 348/708
[58] Field of Search ...................... 358/31, 39, 40, 36, 358/37, 11, 21 R; 348/663, 712, 713, 445, 556, 708, 624, 630; H04N 9/77, 9/78, 11/04, 11/20

[56] References Cited

U.S. PATENT DOCUMENTS 5,041,904  8/1991  Higuchi .................... 358/11

Primary Examiner—James J. Groody
Assistant Examiner—Sherrie Hsia
Attorney, Agent, or Firm—Julie L. Reed; James C. Kesterson; Richard L. Donaldson

[57] ABSTRACT

A color separator (12) for a digital television receiver (10). The incoming television signal is directed to two different paths in the color separator (12). Along a first path, the luminance component is separated by an analog Y separator (12a) and then sampled by an A/D converter (12b) at a rate that will provide a desired number of samples per display line. Along a second path, the composite signal is sampled by an A/D converter (12c) at a rate appropriate for digital color separation, and then the chrominance samples are separated using a digital C separator (12d). A scaling unit (12e) then scales the chrominance samples to provide a desired number of samples per line.

15 Claims, 1 Drawing Sheet

COLOR SEPARATOR FOR DIGITAL TELEVISION

TECHNICAL FIELD OF THE INVENTION

This invention relates to television receivers, and more particularly to sampling an input video signal to obtain pixel data for varying display formats.

BACKGROUND OF THE INVENTION

In many television broadcast signals, notably those adhering to the NTSC and PAL standards, there is a defined relationship between the horizontal line frequency (Fh) and the color subcarrier frequency (Fsc). For example, in NTSC signals, luminance and chrominance are transmitted in a single channel by using a chrominance subcarrier at 3.58 MHz, which is equal to the line frequency, 15,734.26 Hz, times 455/2. This relationship makes it possible to separate luminance and chrominance components in the television receiver, thus avoiding interference between them prior to the recovery of the primary color signals for display.

In digital television systems that follow NTSC standards, typical digital color separation algorithms call for a sampling rate that is some multiple of the 3.58 MHz subcarrier frequency. A commonly used sampling rate is approximately 14.318 MHz, referred to as the "4 fsc" rate. It results in approximately 763 samples of active video data per line.

A problem with the 4 fsc sampling rate is that it is not always consistent with the sampling rate required for a desired number of pixels per line (horizontal resolution). For example, today's enhanced definition television systems, such as "wide NTSC", call for an image that is wider than previous images, with an aspect ratio of 16:9. The desired aspect ratio and the available number of lines per frame determine the horizontal resolution.

The simplest sampling methods provide one sample per pixel. But, in general, the sampling rates for NTSC color separation and for a desired aspect ratio are not the same. For example, for a 480 line display with a 4:3 aspect ratio 640 pixels per line are required. However, as stated above, the 4 fsc sampling rate for NTSC color separation results in 763 samples per line. This requires some sort of means for providing samples for the desired horizontal resolution.

Some existing systems provide the required number of pixels per line by first sampling the incoming data at 4 fsc or some other color burst-related sampling rate, performing color separation, and then scaling the samples to the desired horizontal resolution. However, a problem with scaling is that visual artifacts are likely to occur. Also, the increased complexity of such systems makes them more costly.

SUMMARY OF THE INVENTION

One aspect of the invention is a digital color separator for a television receiver. An analog luminance separation unit receives a tuned input signal and separates the luminance component from the chrominance components of the input signal. A first analog-to-digital converter samples the luminance component at a rate determined by the number of pixels per line to be displayed. A second analog-to-digital converter receiving the tuned input signal and samples it at a rate appropriate for digital color separation. A digital chrominance separation unit receives data samples from the second analog-to-digital converter and separates the luminance samples from the chrominance samples. A scaling unit scales the chrominance samples so that the number of chrominance samples per line is the same as the desired number of pixels per line to be displayed. At this point, both the luminance and the chrominance samples correspond to the desired horizontal resolution.

A technical advantage of the invention is that it provides color separated data from NTSC signals, and also satisfies the horizontal resolution requirements for non-NTSC display formats. Because it avoids the need to scale the luminance component, it minimizes undesirable artifacts. Although the chrominance component is scaled, its lower bandwidth results in a decreased likelihood of artifacts.

DETAILED DESCRIPTION OF THE INVENTION

Figure 1:
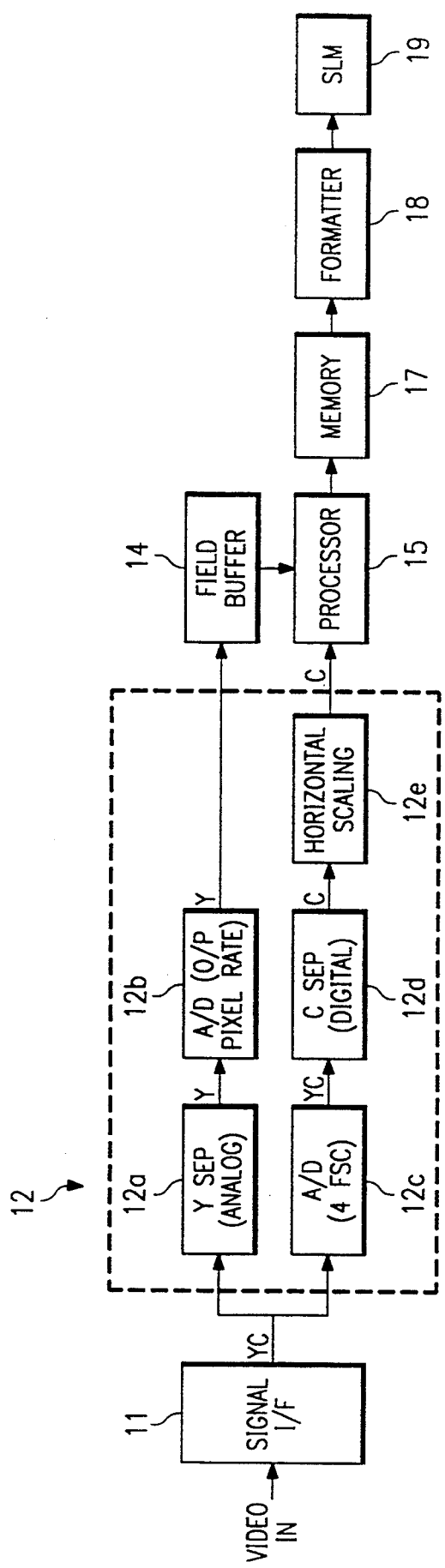
FIG. 1 is a block diagram of video-related components of a digital television receiver.

FIG. 1 illustrates components of a digital receiver. It should be understood that only components used for obtaining output pixel data are shown; components used for tasks such as synchronization and audio signal processing are not shown.

Although the following description is in terms of a receiver for a broadcast television signal, it should be understood that receiver could be any type of equipment for receiving an analog composite video signal and displaying or storing images represented by the signal.

For purposes of this description, a receiver having a vertical resolution of 480 lines is assumed. Receiver has a spatial light modulator (SLM) display, characterized by individually addressable pixel elements, which are capable of being turned on or off simultaneously. Images are formed by addressing those pixels that are to be turned on during an image frame, and by controlling the length of time per frame that each pixel element is on. An example of an SLM is a digital mirror device (DMD) manufactured by Texas Instruments Incorporated. The mirror elements of the DMD are square, such that for a given vertical resolution (VR) and a desired aspect ratio (AR), the horizontal resolution (HR) is determined by:

$$AR = HR/VR$$

Thus, for example, for a desired aspect ratio of 4:3, the number of pixels per line is:

$$4/3 = HR/480$$

$$HR = 640$$

A more complete description of a DMD-based digital television system is set out in U.S. Pat. No. 5,079,544, entitled, "Standard Independent Digitized Video System", and in U.S. patent Ser. No. 08/147,249, entitled "DMD Display System", both assigned to Texas Instruments Incorporated, and both incorporated herein by reference.

The video input may be any analog signal having chrominance and luminance components. The luminance component is referred to herein as the "Y" component, and the chrominance component as the "C" component.

For purposes of this description, it is assumed that the input signal is such that the sampling frequency for digital color separation is not the same as the sampling frequency that will provide the desired number of output pixels per line. For example, if the input signal is an NTSC signal, it has a 3.58 MHz color burst, which serves as a synchronizing signal to establish a frequency and phase reference for chrominance. However, if the input signal is sampled at the rate appropriate for digital color separation, the result is a different number of samples per line than the desired horizontal resolution.

A signal interface 11 provides conventional signal interface functions, such as tuning and filtering. It may also perform tasks such as synchronization signal removal, not related to the subject of the invention. For purposes of the invention, the main function of interface 11 is to provide a composite Y/C signal to two different paths of a color separation unit 12.

On a first path of color separation unit 12, an analog Y separator 12a receives the composite input video signal. Separator 12a may be any analog means for separating the luminance from the chrominance components of the input signal, to produce a luminance signal. Conventional analog color separation methods, such as notch or comb filtering may be used.

A first analog-to-digital (A/D) converter 12b receives the Y signal and samples it at a rate compatible with the desired number of output pixels per row. The required sampling rate is determined by the desired number of pixels per line and the horizontal scan time for active video information. For example, in the NTSC signal, the line period is 63.5 microseconds, of which approximately 52.4 microseconds represent active video information. For a display of 480 rows and 853 pixels per row (16:9 aspect ratio), the sampling rate would be calculated as follows:

Sample rate = 853 pixels/54.2 microseconds
= 16.31 Mhz

For a display of 480 rows and 640 pixels per row (4:3 aspect ratio), the sampling rate is:

Sample rate = 640 pixels/54.2 microseconds
= 12.21 MHz

In enhanced embodiments of the invention, A/D unit 12b could be programmable, so that its sampling rate could be selected according to a desired horizontal resolution.

The rate of sampling by A/D converter 12b is referred to herein as the "output pixel rate" because it is derived as a function of the number of pixels per line to be displayed. However, one function of field buffer 14 may be "field spreading" for SLM-based receivers, which do not require blanking periods. Field spreading permits the active video data to be "spread" throughout the field period, thereby reducing the pixel rate required for delivering data to SLM 19.

On a second path of color separation unit 12, a second A/D converter 12c receives the composite video input signal. It samples the signal at approximately 14.318 MHz, which is 4 times the 3.58 MHz subcarrier frequency. Because the color signal has 455/2 cycles per line, this 4 fsc rate results in 910 cycles per line. As a result, each row of the input signal is sampled 910 times. Of these 910 samples, approximately 750 represent active video data, with the rest being blanking information.

A digital C separation unit 12d separates the Y data from the C data, and outputs a C signal. Conventional digital color separation methods may be used to implement C separation unit 12d.

At this point, Y data and C data are separated and are available in digital form. However, the Y and C signals have been sampled at different rates. The Y data is compatible with the desired horizontal resolution, but the C data is not. The following table illustrates the pixel data characteristics after Y/C separation and sampling:

|        | aspect ratio |     |
|--------|--------------|-----|
|        | 16:9         | 4:3 |
| Y data | 853          | 640 |
| C data | 750          | 750 |

To remedy this incompatibility, the C data is scaled by horizontal scaling unit 12e. The scaling converts each row of 763 pixels into a row of the proper number of output pixels. Assuming a display of 480 rows, for a 16:9 aspect ratio, the 750 samples are scaled to 853 samples, each sample representing the chrominance data for one output pixel. For a 4:3 aspect ratio, the 750 samples are scaled to 640 samples.

Any one of a number of scaling algorithms may be used for scaling. For the 16:9 aspect ratio, one example of a simple scaling algorithm is bilinear interpolation, in which two adjacent samples are used to create a new sample. For chrominance data, "near neighbor" methods may be used. Because the ratio 750/853 is approximately 9/10, for every 9 samples, a new sample is created. It should be understood that some scaling algorithms may result in oversampling or undersampling, such that the number of samples is not necessarily exactly the same as the desired number of output pixels. After the C data is scaled, Y and C samples are available for the desired horizonal resolution. Like A/D unit 12b, scaling unit 12e may be made programmable so that the scaling ratio can be varied according to the desired aspect ratio.

Although scaling unit 12e is shown in FIG. 1 as a stand-alone processing unit, its functions may be performed by processing unit 15, which is programmed to perform a scaling algorithm as well as to perform other processing tasks described below. Also, the horizontal scaling could be performed by processing unit 15 at various points in the chrominance processing path.

Processing unit 15 performs various video processing algorithms, such as converting the digital signals from color difference signals to RGB, progressive scan conversion, and de-gamma correction.

Memory 17 is an active memory for pixel data during processing by processor 15, as well as a frame memory for providing pixel data to SLM 19. In an SLM-based receiver, the data is delivered in "bit-planes", formatted by formatter 18. U.S. patent Ser. No. 08/147,249 incorporated by reference above, describes memory 17, formatter 18, and SLM 19 in further detail and is incorporated herein by reference. As stated above, SLM 19 has an output format that can vary depending on the sampling rate of A/D converter 12b and the scaling factor of scaling unit 12e. Consistent with the examples of this description, SLM 19 might display 640 by 480 pixels for a 4:3 aspect ratio, or 853 by 480 pixels for a 16:9 aspect ratio.

Although not shown in FIG. 1, color separation unit 12 could be used with a digital receiver that has a CRT display. Instead of formatter 18 and SLM 19, the receiver would have a CRT (not shown). For such receivers, the data is converted back to analog form and scanned to the CRT instead of being delivered to SLM 19.

Figure 2:
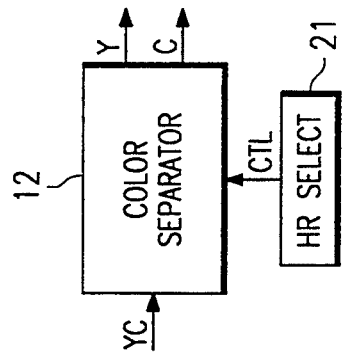
FIG. 2 illustrates a programmable version of the receiver of FIG. 1.

FIG. 2 illustrates a programmable version of the color separator of FIG. 1. As stated above, both A/D converter 12b and scaling unit 12e may be made programmable. A HR select unit 21 permits a user to select a setting for whatever format corresponds to the incoming television signal. Control signals for the appropriate sampling rate and scale factor are determined and delivered to A/D converter 12b and scaling unit 12e, respectively.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A digital color separator for a video signal receiver, comprising:
   an analog luminance separation unit for receiving a video input signal and for separating said signal's luminance component from said signal's chrominance components;
   a first analog-to-digital converter for sampling said luminance component at a rate determined by the number of pixels per line to be displayed;
   a second analog-to-digital converter for receiving said input signal and for sampling said input signal at a rate appropriate for digital color separation;
   a digital chrominance separation unit for receiving data samples from said second analog-to-digital converter and for separating samples of said luminance component from samples of said chrominance components; and
   a scaling unit for scaling said chrominance samples so that the number of chrominance samples per line is substantially the same as said number of pixels per line to be displayed.

2. The digital color separator of claim 1, wherein said first analog-to-digital converter is programmable such that its sampling rate can vary.

3. The digital color separator of claim 1, wherein said scaling unit is programmable such that its scaling factor can vary.

4. The digital color separator of claim 1, wherein said second analog-to-digital converter samples said input signal at the rate that is a multiple of a chrominance subcarrier frequency.

5. The digital color separator of claim 1, wherein said first analog-to-digital converter samples said luminance component at a desired output pixel rate.

6. The digital color separator of claim 1, wherein said scaling unit is a logic circuit.

7. The digital color separator of claim 1, wherein said scaling unit is a processor programmed with a scaling algorithm.

8. A method of separating luminance from chrominance components of a television input signal, comprising the steps of:
   using an analog luminance separation unit to separate the luminance component of said input signal thereby providing a luminance signal;
   sampling said luminance signal at a rate determined by a desired number of pixels per line to be displayed;
   sampling said input signal at a rate appropriate for digital color separation thereby providing combined luminance/chrominance data samples;
   using a digital chrominance separation unit to separate chrominance samples from luminance samples of said combined luminance/chrominance data samples; and
   scaling said chrominance samples such that the number of said chrominance samples per line is substantially the same as said desired number of pixels per line to be displayed.

9. The method of claim 8, wherein said step of sampling said input signal is performed at the rate that is a multiple of a chrominance subcarrier frequency.

10. The method of claim 8, wherein said step of sampling said luminance signal is performed at the rate determined by dividing said desired number of pixels per line by the line period of the input signal.

11. The method of claim 8, further comprising the step of selecting the rate for said step of sampling said luminance signal.

12. A digital signal receiver, comprising:
   a color separator having
      an analog luminance separation unit for receiving an input signal and for separating said signal's luminance component from said signal's chrominance components,
      a first analog-to-digital converter for sampling said luminance component at a rate determined by the number of pixels per line to be displayed,
      a second analog-to-digital converter for receiving said input signal and for sampling said input signal at a rate appropriate for digital color separation,
      a digital chrominance separation unit for receiving data samples from said second analog to digital converter and for separating samples of said luminance component from samples of said chrominance components, and
      a scaling unit for scaling said chrominance samples so that the number of chrominance samples per line is the same as said number of pixels per line to be displayed;
   a processor for receiving luminance data from said first analog-to-digital converter and chrominance data from said scaling unit and for performing pixel processing tasks on said chrominance and luminance data; and
   a memory for storing said pixel data during processing and for providing said pixel data to a display.

13. The receiver of claim 12, further comprising a formatter for receiving such pixel data from said memory and formatting said pixel data, and a spatial light modulator for displaying the formatted data.

14. The receiver of claim 12, further comprising a digital-to-analog converter for receiving such pixel data from said memory and for converting said pixel data to an analog display signal, and a scan type display for displaying said display signal.

15. The receiver of claim 12, wherein said scaling unit is incorporated into said processor.

* * * * *